United States Patent [19]
Jobst

[11] 3,918,387

[45] Nov. 11, 1975

[54] DRIVE SYSTEM
[75] Inventor: Wilhelm Jobst, Bremen, Germany
[73] Assignee: Aktiengesellschaft "Weser", Bremen, Germany
[22] Filed: June 13, 1974
[21] Appl. No.: 479,147

[30] Foreign Application Priority Data
June 16, 1973 Germany............................ 2330832

[52] U.S. Cl. .................................. 115/.5 B; 248/20
[51] Int. Cl.² ......................................... B63H 23/32
[58] Field of Search ............... 115/.5 R, .5 B, 34 R; 248/20, DIG. 1, 6, 8; 308/DIG. 12, 15, 26, 284 R, 284 A

[56] References Cited
UNITED STATES PATENTS

| | | | |
|---|---|---|---|
| 1,788,978 | 1/1931 | Buckendale...................... | 115/34 R |
| 2,521,368 | 9/1950 | Hingerty........................... | 115/34 R |
| 2,635,838 | 4/1953 | Branson............................ | 248/20 |
| 2,772,649 | 12/1956 | Gensheimer..................... | 115/.5 B |
| 2,869,936 | 1/1959 | Federn.............................. | 308/15 |
| 3,428,372 | 2/1969 | Keller et al. ..................... | 308/15 |

FOREIGN PATENTS OR APPLICATIONS

| | | | |
|---|---|---|---|
| 375,959 | 4/1964 | Switzerland...................... | 308/15 |
| 989,161 | 4/1965 | United Kingdom.............. | 115/34 |

Primary Examiner—Trygve M. Blix
Assistant Examiner—Gregory W. O'Connor
Attorney, Agent, or Firm—Michael S. Striker

[57] ABSTRACT

A drive system, particularly for a ship, has a drive unit provided with a housing and an output shaft which extends from this housing and is rotatable about a first axis. A pair of transversely spaced supports engage and support the housing and connecting arrangements connect the housing with these supports so that the housing can pivotably yield about a second axis which crosses the first axis.

10 Claims, 9 Drawing Figures

DRIVE SYSTEM

BACKGROUND OF THE INVENTION

The present invention relates generally to a drive system, and more particularly to a large-dimensioned drive system, especially a drive system for ships.

The invention will hereafter be explained with reference to a drive system for ships, but it should be understood that some problems which are encountered in such drive systems, and which are solved with the present invention, are applicable also to other types of drive systems which are of large dimensions.

The drive system used in a ship for transmitting motion to the propeller or propellers of the ship, usually has its housing mounted at four locations on a base provided for this purpose. The propeller shaft or shafts extend from the housing of the drive unit to the respective propeller or propellers, and based on practical experience, it is customary to mount the respective propeller shaft excentrically, in dependence upon the weight of the propeller, the flexion of the shaft caused by its inherent weight, movements performed by the drive unit housing due to thermal expansion and contraction, and some other factors known to those skilled in the art. This type of construction is based on the assumption that the base for the drive unit housing and the hull of the vessel constitute a rigid unit. The drive units and shaft or shafts of a ship's drive are usually arranged in the rear portion of the ship's hull, and the larger the ship, the more power must be transmitted to its propeller or propellers. Therefore, the larger the ship, the more rigid will be the propeller shaft, whereas on the other hand, the increase in the hull size will result in a decrease of its rigidity, at least with reference to the rigidity of the propeller shaft. This means that the original assumption, namely that the base on which the drive unit housing is mounted forms a rigid whole with the hull, no longer holds true. In particular, wave motion, the effect of loading, the trim of the ship, the degree to which the hull is submerged, lubricating oil temperature differences, sea-water temperature differences, external temperatures, temperatures in the machine room, propeller thrust, flexing of the hull (particularly of a double-bottom hull) in dependence upon different load conditions, and/or torque, cause deformation of the hull and therefore of the base for the drive unit housing, due to bending, twisting or the like. This can lead to damage to the bearings, various gears involved, and thus generally to the drive system per se.

Tests have been carried out which have shown that deviations in the position of the drive shaft bearings occur which may amount to several millimeters, although the permissible tolerance is at most one-tenth of 1 millimeter, and in the case of the gears amounts to at most one to one-hundredth of 1 millimeter. It is evident that this discrepancy can result in substantial damage and, in fact it has been observed that the more rigid the output shaft for the propeller, and the less rigid the ship's hull and the base carried by the same and on which the drive unit housing is mounted, the greater will be the wear of the components involved, the more pronounced will be the premature material fatigue of various components, especially in the gear teeth. This is particularly true because the various influences which bring about the relative movements mentioned above, are not fixed, but change continually. These disadvantages are aggravated by the fact that the orientation of the drive unit or units on the associated base, and of the output shaft to the propeller, is carried out at the ship-yard in conditions in which the hull is submerged only to a minimum extent, and that later the bearing pressures are controlled according to the so-called "Jacking Method" when the ship is fully loaded and the drive unit is at operating temperature. Any adjustments that are required are limited to a readjustment of the center bearing for the drive shaft, located between the drive unit and the tunnel through which the drive shaft passes to the exterior of the hull.

Since the problems which have been outlined above have previously been realized, the prior art has made the suggestion that the housing of the drive unit of a large-dimensioned drive system be mounted on only two bearing supports which are so constructed that they can compensate for thermal expansion and contraction and the like, in direction transversely to the longitudinal axis of the output shaft, so as to reduce or eliminate at least those problems resulting from temperature fluctuations. However, this proposal has not been able to overcome the difficulties resulting from the external influences, and thus has not been satisfactory.

SUMMARY OF THE INVENTION

It is, accordingly, a general object of the invention to overcome the disadvantages of the prior art.

More particularly, it is an object of the invention to provide an improved drive system particularly for ships which avoids the aforementioned disadvantages.

Still more particularly, it is an object of the present invention to provide such an improved drive system wherein the housing of the drive unit is no longer rigidly connected with the hull, and is free to perform limited movements relative to the hull (or to another support, if the drive system is not employed in a ship) so as to eliminate the problems caused by transmission of various influences from the support to the housing of the drive unit.

In keeping with the above objects, and others which will become apparent hereafter, one feature of the invention resides, in a drive system, particularly for ships, in a combination which comprises a drive unit having a housing and an output shaft which extends from the housing and is rotatable about a first axis. A pair of transversely spaced supports engage and support the housing, and connecting means connect the housing with the supports for pivotal yielding about a second axis which crosses the first axis in space.

The second axis extends normal to the first axis, and the supports themselves are resiliently yieldable in the direction normal to the first axis, so that the housing can accommodate itself to flexural movements of the output shaft and can also freely perform movements resulting from thermal expansion and contraction, without any danger that additional stresses might thereby be caused to act upon the drive components of the drive unit, such as gears and the like. On the other hand, any twisting, flexing or other influences acting upon the hull and from the same upon the base on which the drive unit housing is mounted, are not transmitted to the gears of the drive.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
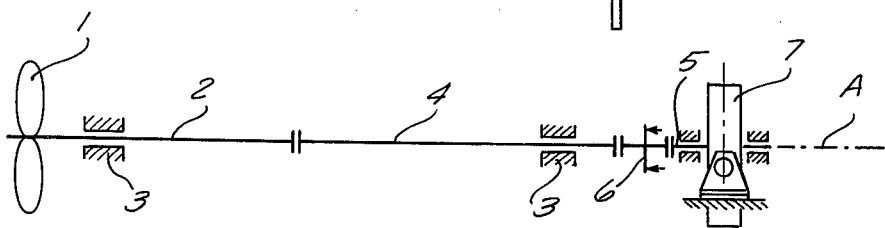
FIG. 1A is a diagrammatic side view, illustrating the desired ideal position of a drive system.
Figure 1B:
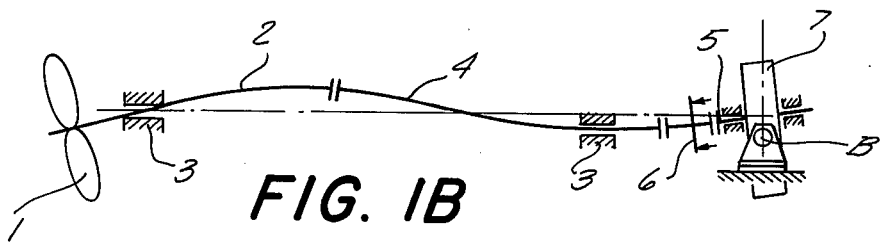
FIG. 1B is a view similar to FIG. 1A, but illustrates the actual operating conditions which occur when the drive system of FIG. 1A is in operation.

Referring now to FIGS. 1A and 1B for an explanation of the concept behind the present invention, it is pointed out that these Figures are diagrammatic but that they clearly illustrate the problems which are encountered. Reference numeral 1 identifies a propeller of a ship's drive, with reference to which the present invention is being explained. Reference numeral 2 identifies the output shaft which is coupled with the propeller 1 and which is supported in one or more bearings 3. The output shaft 2 is coupled with an intermediate shaft 4 that is also journalled in one or more bearings 3, and the intermediate shaft 4 is coupled with the thrust ring of a thrust bearing 6 via which the propeller thrust is transmitted to the output shaft 5 of a drive unit 7, and from there to the hull of the ship (the hull is not illustrated). The drive unit 7 is not described in more detail, since it is conventional (see, i.e., U.S. Pat. No. 2,741,928) and is a reduction gear unit that is well known to those skilled in the art.

If there were no external influences acting upon the system in FIG. 1A, the illustrated condition and orientation would obtain. In actual fact, however, this ideal condition will not exist when the system is in operation. Instead, the actual condition is shown in FIG. 1B where the flexure of the shaft 2, 4, 5 is shown in somewhat exaggerated form, and where the drive unit 7 will be seen to be able to follow this flexural movement due to tilting about the axis B which extends normal to the longitudinal axis of the drive shaft 2, 4, 5 and crosses the same in space. This pivotal movement about the axis B is made possible by the present invention.

Figure 2:
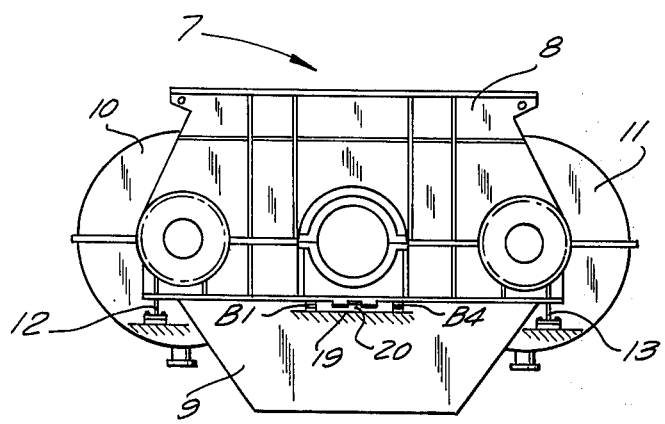
FIG. 2 is an end view of a drive unit housing according to the present invention.
Figure 3:
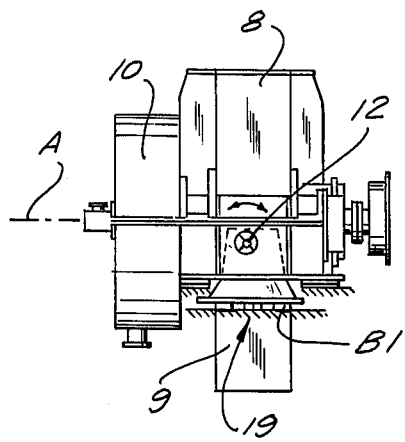
FIG. 3 is a side view of FIG. 2, looking towards the right.
Figure 4:
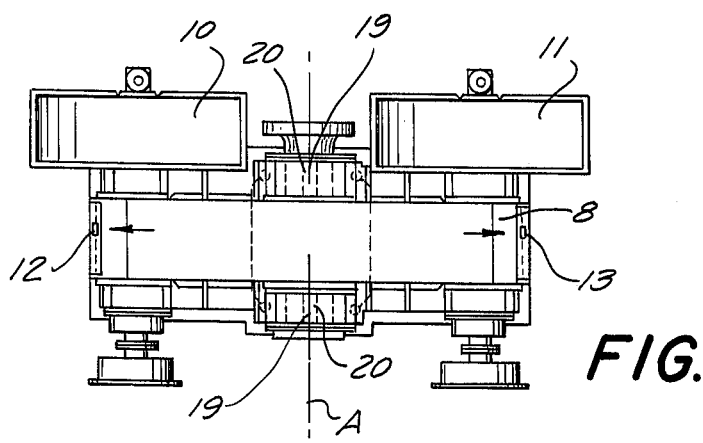
FIG. 4 is a top-plan view of the drive unit housing in FIGS. 2 and 3.

FIGS. 2 – 4 show that the drive unit 7 has a housing which is composed of an upper shell section 8 and a lower shell section 9 which are each of self-supporting rigid construction and abut one another. At one axial side the housing 8, 9 is provided with rigidly mounted hydrodynamic couplings 10 and 11, which transmit the movement of the propulsion machinery of the ship to the drive unit 7 and which will not be described in detail because they are known in the art and their description is not necessary for an understanding of the invention. The housing 8, 9 is supported on a pair of supports 12, 13 which are shown on an enlarged scale in FIGS. 5 and 6 and which will be seen to be laterally offset from the center of the housing 8, 9 towards the couplings 10, 11 which, incidentally could also be replaced by mechanical couplings. The purpose of this offsetting is to compensate for the weight of the couplings 10, 11 and in rest position to obtain as symmetrical as possible a load transmission to the supports 12, 13.

Figure 5:
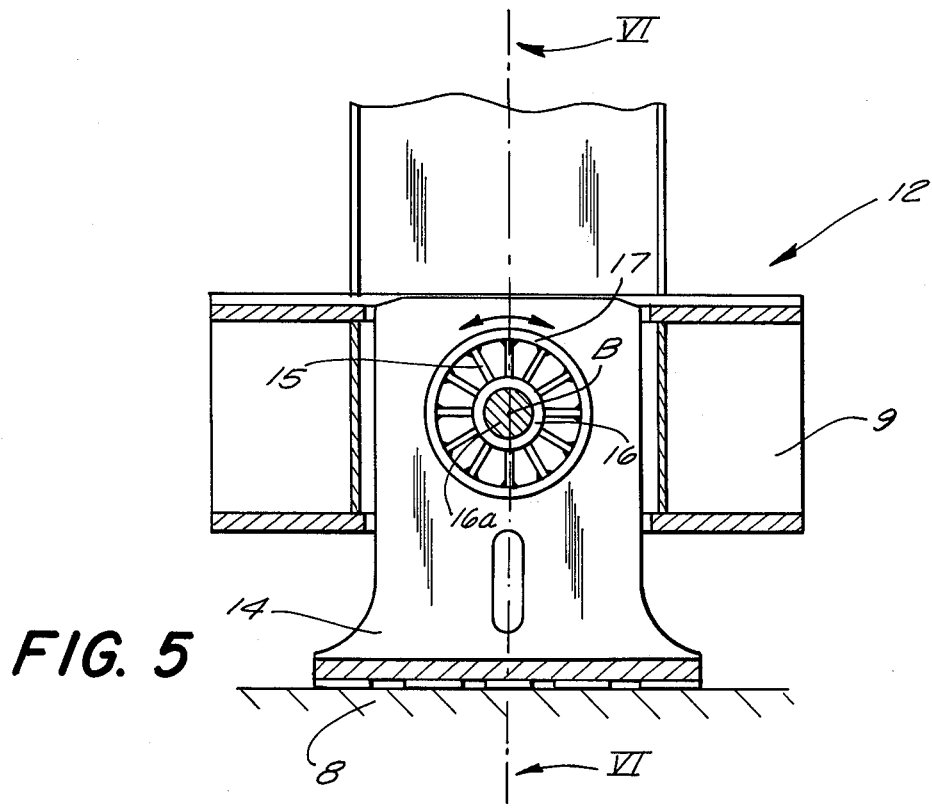
FIG. 5 is a somewhat diagrammatic enlarged-scale view of one of the supports of the housing in FIGS. 2 – 4.
Figure 6:
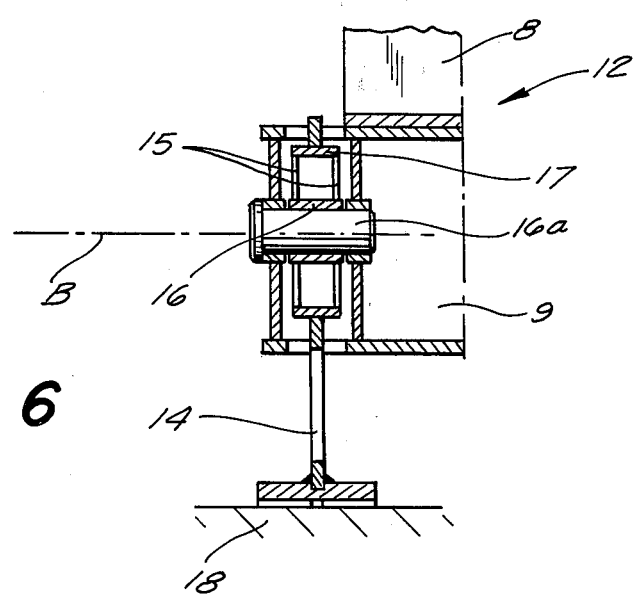
FIG. 6 is a section on line VI—VI of FIG. 5.

FIGS. 5 and 6 show by way of example and in somewhat diagrammatic form the construction of one of the supports, namely the support 12, it being understood that the support 13 is constructed analogously. The support 12 shown in FIGS. 5 and 6 has a base portion 14 which is constructed of sheet-steel of sufficient strength so as to permit flexing in the direction of the axis B, that is transversely to the axis A. According to the invention the support 12 (and similarly the support 13) is connected with the housing section 9 by connecting means that permits pivotal displacement of the housing 8,9 about the axis B, as suggested by the double-headed arrow in FIG. 5. The connecting means comprises a spring unit which in a simple form may utilize a hub 16 and a ring 17 which surrounds the hub concentrically with some spacing from the same. In the illustrated embodiment, both the hub 16 and the ring 17 are in form of sleeves, the hub 16 being connected with the housing portion 9 by means of the short shaft 16a as shown in FIG. 6, whereas the ring 17 is connected (for example by means of welding) with the base portion 14 which in turn is supported on the base 18. A plurality of spokes 15 extends across the clearance between the hub 16 and the ring 17, each spoke having its inner end connected to the hub 16 and its outer end to the ring 17. These spokes 15, which are here arranged in form of two axially spaced discrete sets of spokes (compare FIG. 6), are of elastically yieldable material, for instance, spring-steel. A single set of spokes 15 could be provided, but if two of them are used an improved transverse stability is obtained. It will be appreciated that with this construction the housing 8, 9 can tilt about the axis B as indicated by the double-headed arrow in FIG. 5, without play and with reference to the base portion 14, thus permitting the drive unit 7 to accommodate itself to flexing of the shaft 2, 4, 5, and to compensate for movements resulting from thermal expansion or contraction deformations originating in the drive unit itself, the base 18, the bearings, the shaft or any other influences. Any forces which act transversely to the elongation of the axis A of the shaft 2, 4, 5, are compensated-for by the elastically yieldable characteristic of the base portions 14.

The underside of the housing 8, 9 is provided with grooves 19 extending parallel to the axis A, and the base 18 is provided with similar tongues 20 which engage in these grooves, so as to maintain the housing centered. This centering permits movements of the housing in longitudinal direction of the axis A but does not permit transverse movements, except for those resulting from thermal expansion and contraction.

Figure 8:
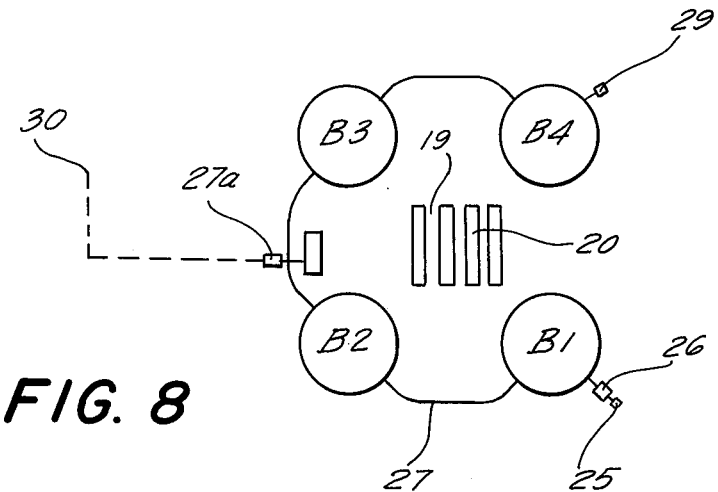
FIG. 8 is a diagrammatic view, showing how several of the devices of FIG. 7 can be connected with one another for use in supporting the drive unit housing of FIGS. 2 – 4.
Figure 7:
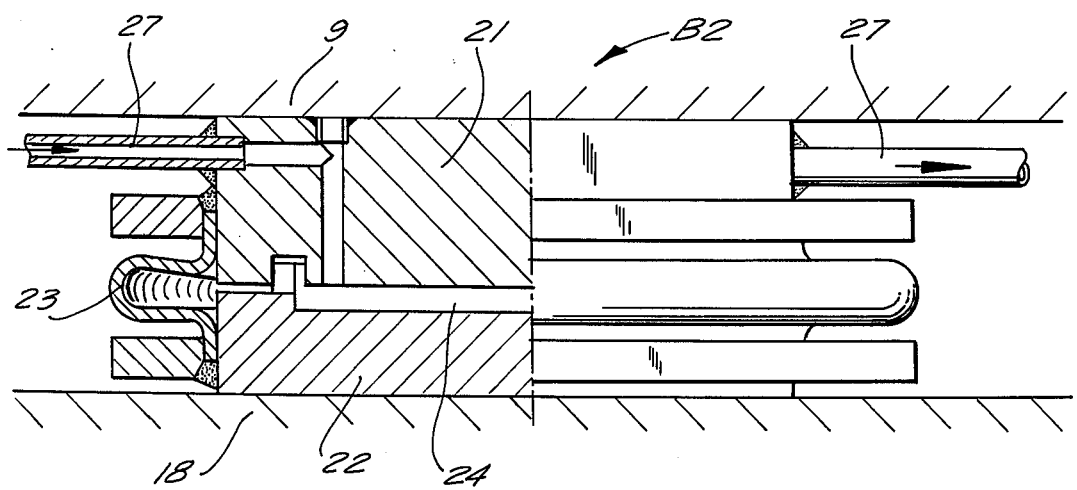
FIG. 7 is a somewhat diagrammatic vertical section through a hydraulic bolster device for use in accordance with the present invention.

In order to support at least part of the weight of the drive unit, a hydraulic bolster may be provided which may be composed of a plurality of individual bolster elements, of which four are provided in this embodiment and are designated with reference numerals B1 – B4 in FIG. 8. One of these units, the bolster unit B2, is shown in detail in FIG. 7, and it will be seen that they operate as hydraulic units. Each of these units, of which the unit B2 in FIG. 7 is representative, has an upper part 21 which is mounted on the housing section 9, and a lower part 22 which is mounted on the base 18 and freely movable vertically with reference to the upper part 21. The two parts define with one another an enclosed space 24 for hydraulic fluid, and are connected all around by a bellows member 23 which connects them fluid-tightly. The units B1 – B4 are connected with one another by a conduit 27 so that their enclosed spaces 24 are in communication.

The system is shown in FIG. 8 and is filled with hydraulic fluid via an inlet 25 having a one-way valve, and a cap 26, by means of which it can be fluid-tightly closed after the hydraulic fluid has been admitted. A pressure indicator 27a is interposed in conduit 27, to indicate the fluid pressure prevailing in the system, and a remote indicator 30 is connected with the pressure indicator 27a to permit a remote examination of the prevailing pressure. A valve 29 is provided through which air is vented from the system, as the same is being filled at the inlet 25. The pressure required to prevail in the system must be accommodated to the weight of the unit 7, in such a manner that the elements B1 – B4 of the system support as much of the weight of the unit 7 as desired, but do not interfere with tilting of the housing of the unit 7 about the axis B.

The use of the illustrated spring units which connect the housing with the base portion 14 is particularly advantageous in view of the relatively high static forces, which are further increased by dynamic influences. Steel strips for the spokes 15 and steel sleeves 16 and 17 are advantageous. However, other types of connecting means might also be utilized.

It will be understood that each of the elements described above, or two or more together, may also find a useful application in other types of constructions differing from the types described above.

While the invention has been illustrated and described as embodied in a drive system which is particularly suitable for use in ships, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a ship drive system wherein the base for the drive unit is subjected to flexural deformation due to the operation of the ship, a combination comprising a drive unit having a housing and an output shaft which extends from said housing and is rotatable about a first axis; a pair of resilient transversely spaced supports engaging and supporting said housing and yieldable in the longitudinal direction of a second axis which crosses said first axis; and resilient connecting means connecting said housing with said supports for pivotal yielding about said second axis.

2. A combination as defined in claim 1, wherein said connecting means comprises a pair of spring units, each associated with one of said supports.

3. A combination as defined in claim 2, wherein said spring units are jointly turnable about said second axis, and wherein the latter extends normal to said first axis.

4. A combination as defined in claim 3, wherein each of said spring units comprises a pair of concentric sleeves which surround one another with clearance and are coaxial with said second axis, one of said sleeves being fixedly connected to the associated support and the other sleeve being fixedly connected to said housing, said spring units each further comprising a plurality of radial spokes of resiliently yieldable material extending across said clearance and having inner and outer end portions which are fixedly connected with the respective sleeves.

5. A combination as defined in claim 4, wherein said spokes are steel strips.

6. A combination as defined in claim 4, wherein said plurality of spokes in each of said spring units is arranged in form of two discrete sets of spokes.

7. A combination as defined in claim 1; and further comprising hydraulic bolster means supporting said housing from below.

8. A combination as defined in claim 7, wherein said hydraulic bolster means comprises a plurality of bolster units each having a fluid chamber for hydraulic fluid, and wherein said fluid chambers communicate with one another.

9. A combination as defined in claim 1; and further comprising a base for said housing, said base being subject to flexural deformation; and cooperating tongues and grooves on said base and said housing and extending longitudinally of said first axis to permit movement in the longitudinal direction of said first axis.

10. In a ship drive system wherein the base for the drive unit is subject to flexural deformation due to the operation of the ship, a combination comprising a base subject to flexural deformation; a drive unit having a housing and an output shaft which extends from said housing and is rotatable about a first axis; a pair of resilient transversely spaced supports connected to said base and engaging and supporting said housing and being yieldable in the longitudinal direction of a second axis which crosses said first axis; cooperating means on said base and said housing for permitting movement in the longitudinal direction of said first axis; resilient connecting means connecting said housing with said supports for pivotal yielding about said second axis; and hydraulic bolster means for supporting said housing from below.

* * * * *